(12) United States Patent
Khadiyev

(10) Patent No.: US 10,685,499 B1
(45) Date of Patent: Jun. 16, 2020

(54) DYNAMIC DETAIL ADAPTIVE HAIR MODELING AND EDITING

(71) Applicant: Ephere Inc., Markham (CA)

(72) Inventor: Marsel Khadiyev, Ontario (CA)

(*) Notice: Subject to any disclaimer, the term of this patent is extended or adjusted under 35 U.S.C. 154(b) by 32 days.

(21) Appl. No.: 16/242,677

(22) Filed: Jan. 8, 2019

(51) Int. Cl.
*G06T 19/20* (2011.01)
*G06T 17/20* (2006.01)

(52) U.S. Cl.
CPC .......... *G06T 19/20* (2013.01); *G06T 17/20* (2013.01); *G06T 2219/2004* (2013.01); *G06T 2219/2016* (2013.01); *G06T 2219/2021* (2013.01)

(58) Field of Classification Search
CPC . G06T 19/20; G06T 17/20; G06T 2219/2004; G06T 2219/2016; G06T 2219/2021
See application file for complete search history.

(56) References Cited

U.S. PATENT DOCUMENTS

| | | | |
|---|---|---|---|
| 7,348,973 B1* | 3/2008 | Gibbs | G06T 17/30 345/419 |
| 2005/0248572 A1* | 11/2005 | Lengyel | G06T 15/04 345/428 |
| 2007/0273685 A1* | 11/2007 | Bruderlin | G06T 13/40 345/419 |
| 2011/0063291 A1* | 3/2011 | Yuksel | G06T 13/40 345/420 |
| 2016/0078675 A1* | 3/2016 | Bowline | G06T 17/20 345/423 |

OTHER PUBLICATIONS

Yuksel, Cem, Scott Schaefer, and John Keyser. "Hair meshes." ACM Transactions on Graphics (TOG) 28.5 (2009): 1-7. (Year: 2009).*

Kim, Tae-Yong, and Ulrich Neumann. "Interactive multiresolution hair modeling and editing." ACM Transactions on Graphics (TOG) 21.3 (2002): 620-629. (Year: 2002).*

* cited by examiner

*Primary Examiner* — Daniel F Hajnik
(74) *Attorney, Agent, or Firm* — Stanzione & Associates, PLLC; Patrick Stanzione (57) ABSTRACT

A system and method to generate independent strand data maps containing changes made to arbitrary strands of hair in a hair model such that when the hair model changes, the previously modified information is preserved. The system and method also provide the ability to apply the modifications to other arbitrary hair models and to reset values from arbitrary hair models containing modified information.

19 Claims, 7 Drawing Sheets

FIG. 8
CONVENTIONAL

DYNAMIC DETAIL ADAPTIVE HAIR MODELING AND EDITING

BACKGROUND OF THE INVENTIVE CONCEPT

Hair in film visual effects and modern video games requires an extensive amount of high fidelity detail in order to appear realistic. At the same time creators of hair must have full control over the hair appearance in order to achieve the desired artistic vision. This poses a challenge for hair modeling software since the software must choose to provide easy hair modeling procedural steps at the expense of modeling high fidelity detail, and visa-versa.

Manual hand-modeling of complex hair grooms with modern hair modeling software allows the most control over directly specifying desired shapes. This is generally performed by using one of two methods. The first method of hand-modeling complex hair grooms is modeling a set of "guide" curves which are then interpolated to dense hair. The second method is altering final dense hair strands individually.

Setting properties to groups of hairs is performed in a similar way. For example, a user can define places on a hair distribution surface (i.e. coordinates) where they want to define some specific properties of the hair, such as hair shape, colors, widths and/or styling. Hairs nearby these coordinates will use the specified properties.

"Guides" are usually generated separately and later hand-edited by a user through control point manipulation or brushing. Some currently known tools, such as Houdini™, Maya™, and Ornatrix™, allow original input guides to be altered/modified (i.e., their count or order can change), and the applied modifications will be "re-mapped" to the new input guides by surface interpolation.

However, these current approaches force users to either operate on a sparse set of guides, use different ways of wrapping hairs using editable hair volumes, or modify dense hairs directly one by one.

Using sparse guides is the most widely used approach in specifying hair parameters (i.e., shape, widths, animation, etc.) because it allows a user to work with a manageable number of strands. However, it is difficult to define fine details of final hairs using guides. Using guides usually requires manually creating more guides where detail is required, which at some point makes the guide count less manageable.

Wrapping hairs in a volume is a useful approach for defining procedural hair. This approach makes it easy to change the overall shape of many final hairs, but it lacks the ability to edit finals hairs.

Editing final hairs directly allows an artist ultimate control over the look of their groom, but this approach also forces the need to create final hairs before editing begins, because introducing new hairs or reordering hairs will not apply to previously defined shape changes and can even invalidate shape changes. In addition, this approach requires an extensive amount of storage and memory allocation to be able to hold all the per-strand editing information.

FIELD OF THE INVENTIVE CONCEPT

The present inventive concept pertains to the field of computer graphics generating, modeling and editing of hair strands. More specifically, the present inventive concept pertains to a system and method of generating, modeling and editing hair strands at any stage of the process, while obtaining high quality resolution and details.

DESCRIPTION OF THE RELATED ART

The software "MAYA™" by AUTODESK contains hair editing functionality called Interactive Groom Sculpting (IGS). With this software a user can directly manipulate the shape of dense hairs using a variety of curve editing tools such as a comb, grab, and cut brushes. Before or after the editing of hair shape is performed, the user can increase or decrease the density of the hairs, resulting in more or fewer overall hair strands. Any previously sculpted shape changes to the hair are applied to the new set of hair strands (the number of which changes due to the aforementioned density parameter changes). This is understood to be done by interpolating the previously sculpted hair changes based on positions of new strands. However, this process can result in loss of fidelity in sculpted hair detail. If the hair density is reduced, then any previously sculpted changes will apply to new, more sparse sets of strands. Increasing the density back to original value will result in a loss of detail which was previously created during user editing. An extreme example of this is when a user reduces hair density to 0, resulting in no hair strands being generated at all. Increasing the density to its original value will result in all previous hair sculpting to be erased. See:

"Working with sculpt layers:" https://knowledge.autodesk.com/support/maya/learn-explore/caas/CloudHelp/cloudhelp/2018/ENU/Maya-CharEffEnvBuild/files/GUID-71A6505B-55C4-4BD0-A177-3EA956A1D4AD-htm.html; and "Xgen interactive grooming:" http://help.autodesk.com/view/MAYAUL/2017/ENU/?guid=GUID-496603B0-F929-45CD-B607-1CFCD3283DBE; and http://help.autodesk.com/view/MAYAUL/2018/ENU/?guid=GUID-A00D16BD-9ECC-4C63-BAB5-B0278BF596BB.

Houdini™ by SIDE EFFECTS SOFTWARE is a widely used "Visual Effects" software which contains hair generation and grooming tools. Houdini™ solves the problem of editing the shape of hair with changing complexity by abstracting the information about free hand brush strokes from the hair shape. Each comb brush stroke, for example, is stored/recorded as a geometric curve in 3D space and can be re-applied to a different set of hair strands in the future. This independence of hair editing information from actual hairs solves the problem of changing hair complexity while also not losing any information. See "Houdini 16.5 grooming masterclass:" https://vimeo.com/241572150.

However, there are several drawbacks to the above-described approach. First, if input hair strands are modified after free-hand combing is performed on the hair, the user is required to "Re-cache Strokes" to re-calculate how the stored brush modifications will apply to a new set of strands. This process is slow and inconvenient for the user. Second, storing brush strokes increasingly requires more and more memory and processor resources, and it complicates the grooming process more and more over time. Third, brush strokes are stored in object space. As a result, if the input hair roots change, for example as a result of hair generation surface deforming due to user modeling or animation, then the brush strokes, which do not account for these deformations, can significantly alter the shapes of the resulting hair strands. Additionally, when the user chooses to modify the input hair strand lengths, the brush stroke shape changes do not account for this, and as a result will produce undesired shapes. Furthermore, if the "Recache Strokes" function is not used after input hair shape is modified, this software by Houdini™ calculates the resulting hair shapes incorrectly by re-applying all the previous changes in object space.

In U.S. Pat. No. 6,720,962 by Alter, a method of hair generation is performed by generating a lattice structure of guide columns. The guide columns/hairs are then re-oriented by using underlying polygons and their normal as a base coordinate system for the columns in a deformed state. The hair is multiplied into a guide volume utilizing lattice interpolation. This patent discusses the usage of a basic interpolation technique where guides form a "lattice" and hairs generated within this lattice adopt guide shapes by interpolating between them: https://patentimages.storage.googleapis.com/96/1a/35/0c65c54a469f10/US6720962.pdf However, with the method by Alter, a user can only remove or add new guides manually. Hair cannot be combed free-hand by a user. Accordingly, a major drawback with this method is that the shape of the hair is completely defined using guides. As a result, it is not easy to quickly add or remove details of the resulting hairs.

Accordingly, there is a need for a system and method of being able to change hair models without losing the editing information previously performed on the hair. There is also a need for a system and method of retaining all of hair editing information without an increasing complexity of storing editing information that causes memory and/or processor resource problems.

SUMMARY OF THE INVENTIVE CONCEPT

The present general inventive concept provides a system and method to Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of modeling hair strands, comprising: generating, with a computer processor, a first base surface containing a plurality of hair strands with root coordinates; modifying at least one property of one or more hair strands in the base surface; storing the at least one modified property of the one or more hair strands with data representing the modifications and the non-modified hair strands with original data to generate a first initialized strand data map; generating a second base surface containing a plurality of hair strands with root coordinates; applying the first strand data map to the second base surface; calculating strand data for each of the hair strands on the second base surface whose closest root coordinates in the first strand data map have strand data by using the strand data of the root coordinates closest thereto; assigning the calculated strand data to the root coordinates of the hair strands whose closest root coordinates in the strand data map have strand data and leaving the remaining hair strands on the second base surface un-modified: storing the assigned strand data as a second strand data map; generating a third base surface containing a plurality of hair strands with root coordinates, wherein strand data of one or more of the root coordinates is modified; applying the second strand data map to the third base surface; and inserting the modified root coordinates with modification strand data into the second strand data map.

In an exemplary embodiment, the method further comprises deleting all root coordinates in the second strand data map whose closest root coordinates are the root coordinates modified in the third base surface.

In another exemplary embodiment, the method further comprises updating the root coordinates in the second strand data map whose closest root coordinates are the root coordinates modified in the third base surface by adding the modification information of closest root coordinates thereto.

In another exemplary embodiment, the operation of calculating strand data for each of the hair strands on the second base surface which are closest to the root coordinates in the first strand data map is performed by interpolating the hair strand data based on strand data stored in the strand data map.

In still another exemplary embodiment, the at least one property being modified in includes one or more of shape data, width data, and texture data.

In still another exemplary embodiment, the method further includes generating a fourth base surface containing a plurality of hair strands with root coordinates, one or more of the root coordinates being modified; applying one of the first or second strand data map to the fourth base surface; deleting all of the roots in the applied strand data map which are closest to the modified roots coordinates in the fourth base surface; and inserting the selected roots of the fourth base surface into the applied strand data map with strand data being revised to be unmodified data.

The foregoing and/or other features and utilities of the present general inventive concept may also be achieved by providing a system to model hair strands, the system comprising: a computing device having a processor, wherein the processor is configured to: generate a first base surface containing a plurality of hair strands with root coordinates; modify at least one property of one or more hair strands; store the at least one modified property of the one or more hair strands with data representing the modifications and the non-modified hair strands with un-modified data to generate a first strand data map; generate a second base surface containing a plurality of hair strands with root coordinates; apply the first strand data map to the second base surface; calculate strand data for each of the hair strands on the second base surface whose closest root coordinates in the first strand data map have strand data by using the strand data of the root coordinates closest thereto; assign the calculated strand data to the root coordinates of the hair strands whose closest root coordinates in the strand data map have strand data and leave the remaining hair strands on the second base surface un-modified; store the assigned strand data as a second strand data map; generate a third base surface containing a plurality of hair strands with root coordinates, wherein strand data of one or more of the root coordinates is modified; apply the second strand data map to the third base surface; and insert the modified root coordinates with modification strand data into the second strand data map.

In exemplary embodiment, the processor is further configured to delete all root coordinates in the second strand data map whose closest root coordinates are the root coordinates modified in the third base surface.

In another exemplary embodiment, the operation of calculating strand data for each of the hair strands on the second base surface which are closest to the root coordinates in the first updated strand data map is performed by interpolating the hair strand data based on strand data stored in the strand data map.

In another exemplary embodiment, the at least one property being modified in includes one or more of shape data, width data, and texture data.

In still another exemplary embodiment, the processor is further configured to: generate a fourth base surface containing a plurality of hair strands with root coordinates, one or more of the root coordinates being modified; apply one of the first or second strand data map to the fourth base surface; delete all of the roots in the applied strand data map which are closest to the modified roots coordinates in the fourth base surface; and insert the selected roots into the applied strand data map with strand data being revised to be un-modified data.

The foregoing and/or other features and utilities of the present general inventive concept may also be achieved by providing a non-transient computer-readable medium comprising instructions executed by a processor of a computing device to: generate a first base surface containing a plurality of hair strands with root coordinates; modify at least one property of one or more hair strands; store the at least one modified property of the one or more hair strands with data representing the modifications and the non-modified hair strands with un-modified data to generate a first strand data map; generate a second base surface containing a plurality of hair strands with root coordinates; apply the first strand data map to the second base surface; calculate strand data for each of the hair strands on the second base surface whose closest root coordinates in the first strand data map have strand data by using the strand data of the root coordinates closest thereto; assign the calculated strand data to the root coordinates of the hair strands whose closest root coordinates in the strand data map have strand data and leaving the remaining hair strands on the second base surface un-modified; store the second base surface with the assigned strand data as a second strand data map; generate a third base surface containing a plurality of hair strands with root coordinates, wherein strand data of one or more of the root coordinates is modified; apply the second strand data map to the third base surface; and insert the modified root coordinates with modification strand data into the second strand data map.

In an exemplary embodiment, the instructions are further executed by the processor to delete all root coordinates in the second strand data map whose closest root coordinates are the root coordinates modified in the third base surface.

In another exemplary embodiment, the instructions are further executed by the processor to update the root coordinates in the second strand data map whose closest root coordinates are the root coordinates modified in the third base surface by adding the modification information of closest root coordinates thereto.

In another exemplary embodiment, the operation of calculating strand data for each of the hair strands on the second base surface which are closest to the root coordinates in the first strand data map is performed by interpolating the hair strand data based on strand data stored in the strand data map.

In still another exemplary embodiment, the instructions are further executed by the processor to: generate a fourth base surface containing a plurality of hair strands with root coordinates, one or more of the root coordinates being modified; apply one of the first or second strand data map to the fourth base surface; delete all of the roots in the applied strand data map which are closest to the modified roots coordinates in the fourth base surface; and insert the selected roots into the applied strand data map with strand data being revised to be empty data.

The foregoing and/or other features and utilities of the present general inventive concept may also be achieved by providing a method of modeling hair strands, comprising: generating, with a computer processor, an initial hair mesh of hair strands on a base surface; modifying shapes of onesome or more of the hair strands on the initial hair mesh; initializing a strand data map from the modified hair mesh by inserting empty strand data representing un-modified hair strands and inserting strand data containing at least shape modification data representing the modified hair strands; exposing a sub-set of the hair strands on the modified hair mesh while hiding the remaining hair strands to produce a hair mesh having a different hair strand count from the initial hair mesh; adding new hair strands to the exposed sub-set of the hair strands and modifying the strand shapes of hair strands; inserting new strand data into the strand data map for the newly added hair strands and strand data shape modifications; exposing all of the hair strands in the modified hair mesh; and applying all of the strand data of the hair strand map to the hair mesh to reproduce all of the hair editing strand data.

In an exemplary embodiment, the method further comprises generating a fourth base surface containing a plurality of hair strands with root coordinates, one or more of the root coordinates being modified; applying one of the first or second strand data map to the fourth base surface; deleting all of the roots in the applied strand data map which are closest to the modified roots coordinates in the fourth base surface; and inserting the selected roots into the applied strand data map with strand data being revised to be empty data.

BRIEF DESCRIPTION OF THE DRAWINGS

These and/or other features and utilities of the present inventive concept will become apparent and more readily appreciated from the following description of the exemplary embodiments, taken in conjunction with the accompanying drawings of which.

DETAILED DESCRIPTION OF THE PREFERRED EMBODIMENTS

Reference will now be made in detail to the embodiments of the present inventive concept, examples of which are illustrated in the accompanying drawings, wherein like reference numerals refer to the like elements throughout. The embodiments are described below in order to explain the present inventive concept while referring to the figures. Also, while describing the present inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit to process at least one function or operation, wherein the unit and the block may be embodied as hardware or software or embodied by combining hardware and software.

Hereinafter, one or more exemplary embodiments of the present inventive concept will be described in detail with reference to accompanying drawings.

Exemplary embodiments of the present general inventive concept describe a system and method that provides the ability to edit various properties of hair, including shape changes, widths, texture coordinates, or any other properties which can be associated with hair, by allowing the resolution/detail of changes to change automatically based on modified hair strands.

Figure 1:
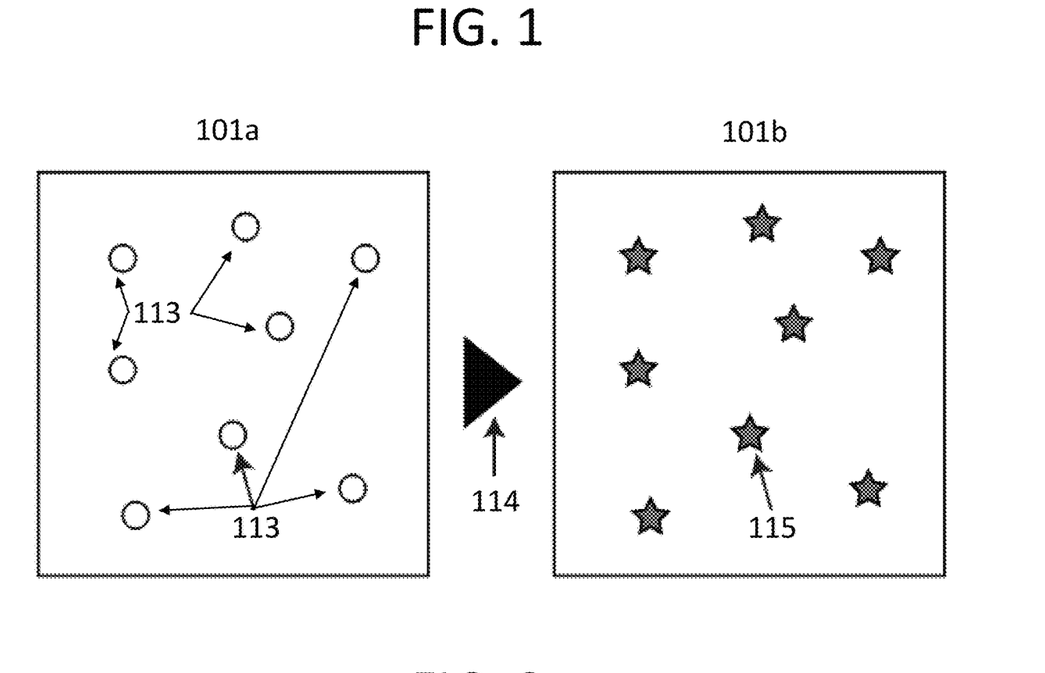
FIG. 1 illustrates initializing a Strand Data Map with arbitrary hair strands including Strand Data, according to an exemplary embodiment of the present inventive concept.

FIG. 1 illustrates a process of initializing a Strand Data Map from hair strands (i.e., a hair mesh) extending from a base surface, according to an exemplary embodiment of the present inventive concept. The hair strands and base surface can be generated with a computer processor operated with the assistance of a hair generation program stored in a database of the computer. A legend is provided below to help explain the various process steps in accordance with the exemplary embodiments described herein:

○ Non-selected hair root
● Selected hair root
✹ Strand Data Map root containing Strand Data
x "Empty" Strand Data Map root
— Closest root lookup Referring to FIG. 1, arbitrary hair strands (i.e., hair mesh) with roots [113] including root coordinates are generated on a "Base Surface" 101a, as illustrated in diagram 101a in FIG. 1. Generating such a Base Surface 101a including arbitrary hair strands with roots [113] and root coordinates is known in the hair modeling technology. The processes of adaptive hair modeling and editing according to the exemplary embodiments described herein are specifically developed computer program software processes that can be stored in a computer database or other non-transitory computer-readable mediums. These developed computer program software processes include instructions that are executed by a computer processor.

Each of the hair strands with roots [113] generally include root coordinates that are provided for placement of the hair strands on a 3D surface, such as Base Surface 101a. The Base Surface 101a in FIG. 1 can be a geometric 3D representation of a surface on which hairs are generated. For example, the Base Surface 101a can be a polygon mesh or a Non-Uniform Rational B-Spline (NURBS) surface. However, the Base Surface can be any type of surface in which hair is generated, which supports the intended purposes of the present inventive concept, as described herein.

Each hair strand root [113] of the arbitrary hair strands on the Base Surface 101a can contain "Strand Data." Strand Data can include various information attached to a strand of hair, or provided at a location of a strand of hair. The Strand Data can define all of the hairs' properties. Strand Data can be uniquely identified inside a two-dimensional (2D) or three-dimensional (3D) space using an accompanying 2D or 3D vector coordinate. Strand Data can be provided to represent such hair strand data as, for example, the location of a hair strand, the shape of a hair strand, the thickness of a hair strand, the texture coordinates of a hair strand, etc. However, Strand Data is not limited to such properties, and can include additional properties of hair as desired for the modeling and editing purposes as described in the exemplary embodiment herein.

Figure 8:
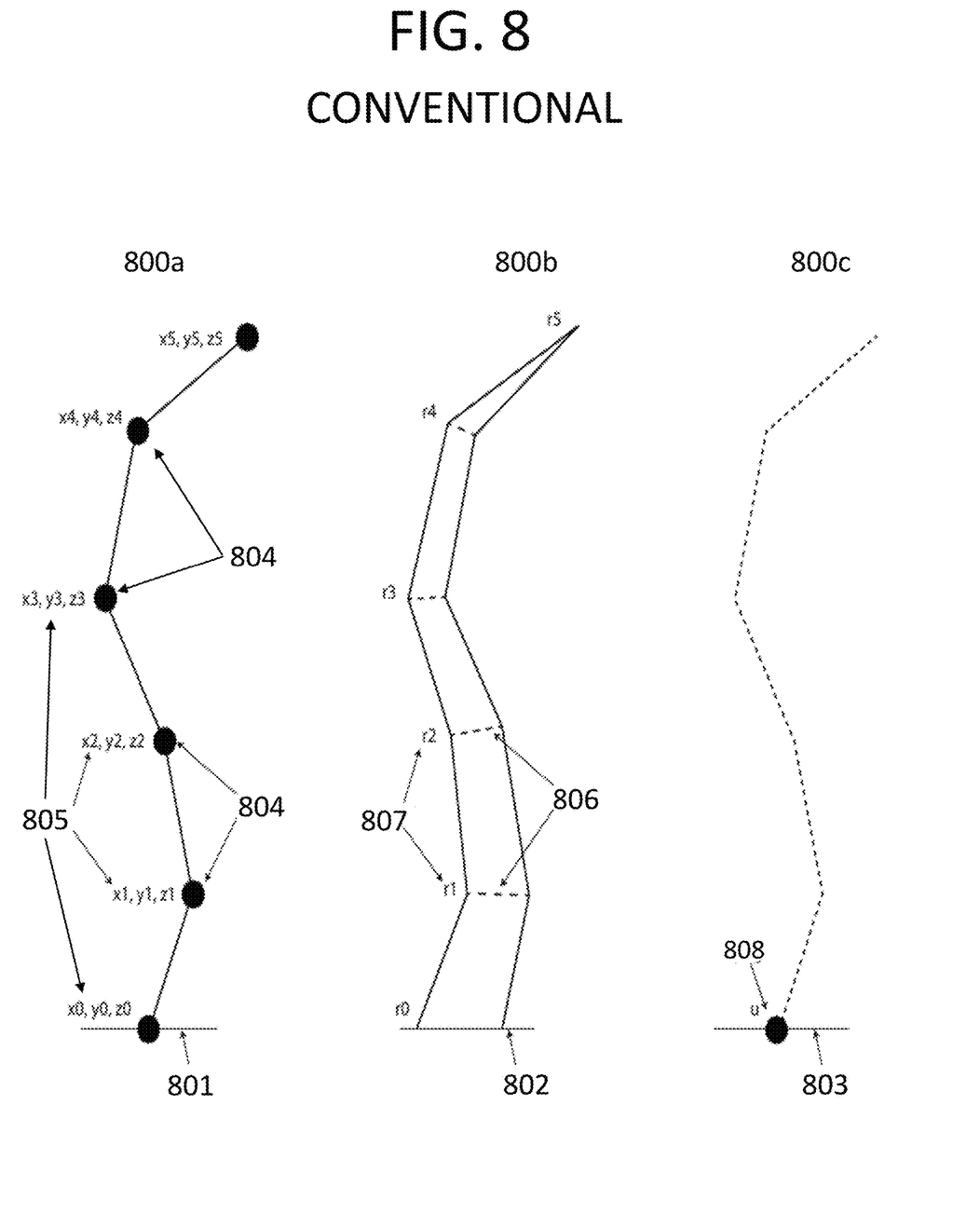
FIG. 8 illustrates hair strands and different types of Strand Data that can be stored for a particular strand coordinate.

FIG. 8 provides an illustration of a conventional use of Strand Data to represent hair strands.

Referring to FIG. 8, three different forms of Strand Data are illustrated to help describe the different properties that can be represented as data for hair strands. Also provided below with reference to FIG. 8 is a description of how this Strand Data can be stored for a particular hair strand coordinate. More specifically, in diagram 800a of FIG. 8, reference number [801] illustrates a hair strand comprising 6 points [804] which define the strand's geometric shape in 3D space. For each point [804] a 3D coordinate [805] is stored with Strand Data. Diagram 800b of FIG. 8 illustrates a hair strand [802] also comprising the same 6 points [804] as hair strand [801], wherein each point [804] includes a radius (r) value [806]. For each point [804], a single floating point radius [807] can also be stored as Strand Data. Diagram 800c of FIG. 8 illustrates a hair strand [803] containing a single datum (u) point [808]. This single datum point [808] can include data representing all properties of a hair strand required for modeling and editing purposes. This single datum point [808] can also be stored as Strand Data. The Strand Data [805], [807], and [808] can be provided in the form of a floating point, an integer, Boolean format, a string, or any other format which can be stored in a computer RAM/ROM memory and represent information regarding hair strands.

Referring back to FIG. 1, the Strand Data provided for each hair strand of the hair strand root [113] can be inserted (see arrow [114]) into a Strand Data Map 101b, thus initializing the Strand Data Map 101b with root coordinates [115] including the Strand Data. The initialized Strand Data Map 101b can then be stored in a computer database, or other storage medium, for later use during the unique processes of dynamic detail adaptive modeling and editing hair strands, according to the exemplary embodiments described herein.

Diagram 101b of FIG. 1 illustrates an initialized Strand Data Map comprising the generated arbitrary hair mesh with root coordinates [115] each including Strand Data. As described above, the Strand Data Map 101b can store multiple root coordinates for hair strands as well as a plurality of Strand Data associated with each said root coordinate. With the Strand Data Map 101b, a quick lookup of Strand Data can be performed by accessing the data in a given root coordinate. The Strand Data Map 101b can also be used to find one or more Strand Data for newly provided hair strands closest to a given root coordinate on the Map. The Strand Data can also be associated with and provide information for other coordinate locations along each hair strand.

Figure 2:
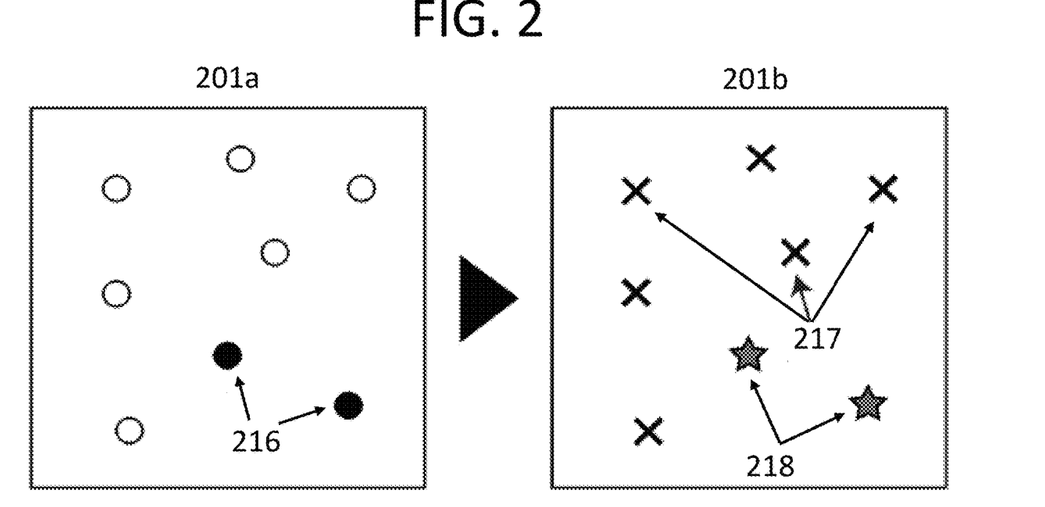
FIG. 2 illustrates initializing a Strand Data Map from arbitrary hair strands that have been modified, according to an exemplary embodiment of the present inventive concept.

FIG. 2 illustrates a process of initializing a Strand Data Map 201b from arbitrary hair strands (i.e., a hair mesh) containing a "selection." A "selection" refers to only hairs within a mesh (or other generated hair configuration) that are edited/modified by a user via hair editing software executed by a computer processor configured to perform hair editing functions. For example, if a hair mesh consisting of plural hair strands is generated (i.e., on a base surface), and then a few of the hair strands within the hair mesh are combed or modified/edited/deleted in another way, these few strands that are modified will be considered throughout this specification as "selected" hair strands. Throughout this detailed specification the terms "modified" and "selected" are interchangeable.

In FIG. 2 a few of the arbitrary hair strands in the hair mesh of the initialized Strand Data Map 101b are "selected" (modified in some way). In detail, diagram 201a of FIG. 2 illustrates where two of the roots [115] each including Strand Data are selected (solid circles ●), i.e., modified. Any number of the hair strands [115] may be selected by the user as desired. The selected roots are illustrated with a solid dot ● and are represented in this example with a new reference number [216]. The selected roots ● [216], including their root coordinates and Strand Data representing the modifications, can be applied to the Strand Data Map 101b, thus initializing a new Strand Data Map 201b, as shown by stars and represented as new reference numbers [218]. All the non-selected roots (referenced by hollow circles ○) of the arbitrary hair strands in diagram 201a can also be inserted into the Strand Data Map 201b, as shown by an "x" and represented by new reference numbers [217]. However, these non-selected roots [217] will be identified as "empty," thus being labeled with an "x," meaning no Strand Data is provided for these root coordinates ○ [217].

The above described step for a hair modeling/editing process is referred to as initializing a Strand Data Map from a hair mesh or from a previously initialized and stored Strand Data Map, in which one or more hair strands are selected to be modified, and now contain Strand Data representing the modification(s). It is to be noted that a Strand Data Map can be initialized by storing a mesh of hair strands on a Base Surface, in which one or more of the hair strands have been selected, but are not yet stored as an initialized Strand Data Map. Once the modified hair mesh is stored with the Strand Data representing the modifications of some hairs and the un-modified hair strands, it can be referenced at a later time for modeling and editing new sets hair strands or a mesh of hair strands.

At this point the user can decide to increase or decrease the hair count from the initialized Strand Data Map [201b].

Figure 3A:
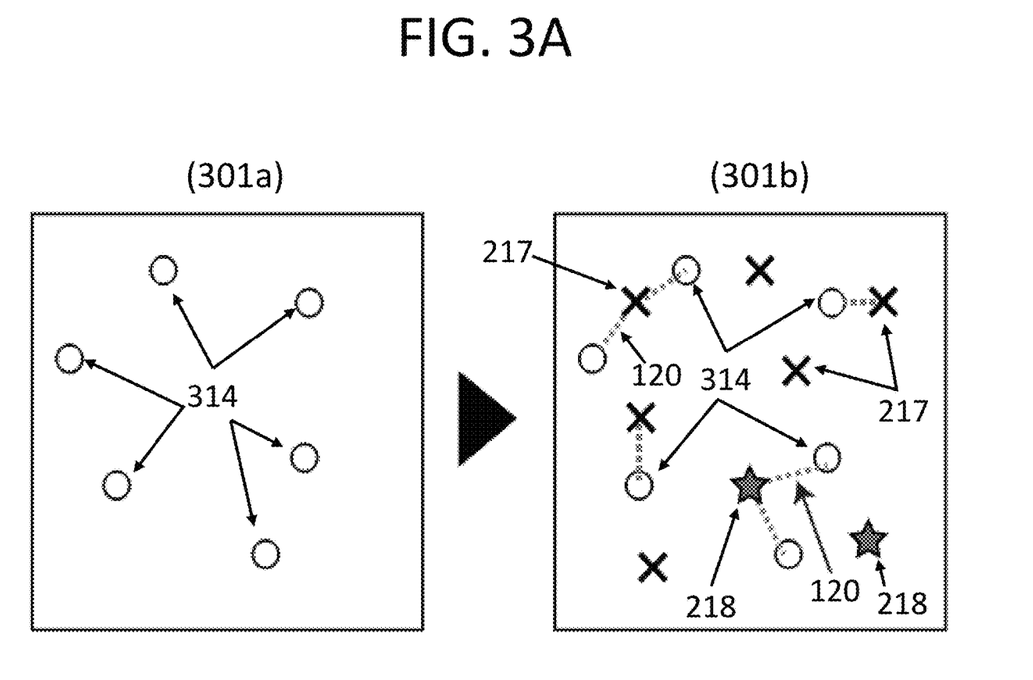
FIG. 3A illustrates a process of calculating Strand Data for an arbitrary hair mesh from a Strand Data Map, according to an exemplary embodiment of the present inventive concept.

Referring to FIG. 3A, arbitrary hair strands with roots [314] including root coordinates, can be generated on a Base Surface such as illustrated in diagram 301a. The generated arbitrary hair strands with roots [314] can be the same or a different set of hairs strands from the arbitrary hair strands (or hair mesh) described with reference to diagram 101a of FIG. 1 or 201a of FIG. 2. Here the received arbitrary hairs are a completely different set of hair strands, thus being referred to as new reference numbers [314].

The stored Strand Data Map 201b of FIG. 2 can be applied to the arbitrary hair strands with roots [314], as illustrated in diagram 301b of FIG. 3A. It is to be noted that any reference to applying a Strand Data Map to arbitrary hair strands, for purposes of understanding this invention, means inserting the Strand Data of a Strand Data Map to a Base Surface of hair strands, a mesh or any other form of arbitrary hair strands, where the inserted Strand Data can then be used to calculate and/or assign Strand Data to the arbitrary hair strands. As illustrated, the previously selected strand roots [218] and non-selected hair strand roots [217] are the same as those in the Strand Data Map 201b.

At this point a number N of closest root coordinates among the current roots [314] with respect to the root coordinates [217] and [218] (from Strand Data Map 201b) can be located for modeling and editing purposes. The distances between the N closest roots [314] and the roots [217] and [218] in Strand Data Map 201b are shown by the dotted lines [120] in diagram 301b. Strand Data representing each of the root coordinates of the hair strand roots [314] can then be calculated and assigned to the hair strand roots [314].

The calculation of Strand Data can be performed by interpolating N Strand Data values from the Strand Data Map 201b, as shown diagram 301b. A process of interpolation that can be performed to obtain the Strand Data for hair strand root coordinates [314], according to an exemplary embodiment, is described below with reference to FIG. 4. However, alternative methods of interpolation can be used, which provide the intended purposes of the present inventive concept as described herein.

If an N root (or roots) is closest to a root in the Strand Data Map 201b which is marked as being "empty" (i.e. roots [217] marked by an "x"), then no action may be performed for these current roots [314]. In accordance with an exemplary embodiment, the roots [314] that are assigned Strand Data are referred to as N closest roots to the Strand Data Map root(s) [218] containing Strand Data. The roots [218] in the Strand Data Map containing Strand Data are represented by the stars, as previously illustrated in Strand Data Map 201b of FIG. 2. In other words, as described above with reference to FIG. 2, roots [218] were previously selected, as represented by the solid dots ● [216], and then stored with Strand Data indicative of the modifications, to create Strand Data Map 201b. As a result, these selected roots are represented by the "stars" [218], as illustrated in diagram 201b of FIG. 2. Diagram 301b of FIG. 3A illustrates how the Strand Data Map 201b can be applied to the hair mesh in diagram 301a to calculate, via interpolation, Strand Data for the two strands closest to the roots [218] of the Strand Data Map 201b.

Figure 4:
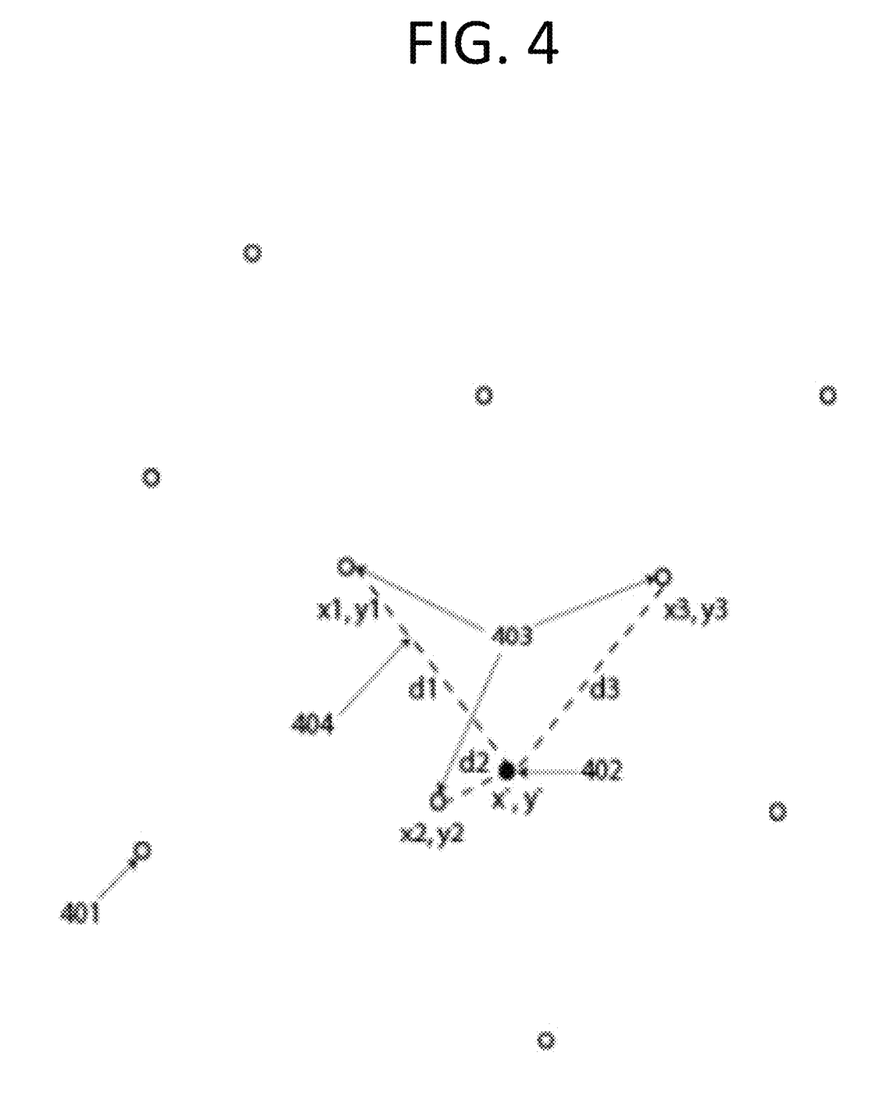
FIG. 4 illustrates a process of performing interpolation to calculate strand data values for a hair strand in an arbitrary hair mesh.

FIG. 4 illustrates a process of interpolating a value for a strand of arbitrary hair based on data stored within a Strand Data Map, such as the Strand Data Map 201b illustrated in FIG. 2, according to an exemplary embodiment of the present inventive concept. According to this example embodiment of interpolating a value for a strand of hair, some Strand Data contained in a Strand Data Map between 3 strands (with roots 403) inside the Strand Data Map is interpolated. Accordingly, the value of N in this case (where N =the number of closest root coordinates to the hair root coordinate inside the Strand Data Map) is 3. In FIG. 4 there are roots [401] in an arbitrary/input hair mesh defined using two-dimensional Root Coordinates (x, y). There is a root coordinate (x', y') [402] located in the same space as Root Coordinates for which it is desired to obtain an interpolated Strand Data value. At first, the three roots [403] in the Strand Data Map geometrically closest to the desired position (x', y') [402], are selected. The positions of the three roots [403] are $(x_1, y_1)$, $(x_2, y_2)$, and $(x_3, y_3)$, and the distance from each root [403] to coordinate (x', y') [402] is d1, d2, d3, respectively. Each distance d1, d2 and d3 from the desired position (x', y') [402] to the three roots [403] can be determined by the geometric distance formula $d_n = \text{sqrt}((x_n-x')^2+(y_n-y')^2)$. Therefore, the inverse distance values $d'_n = 1-(d_n/(d_1+d_2+d_3))$ are first calculated. Then weight values $w_1$, $w_2$ and $w_3$ can be calculated by using the formula $w_n = d'_n/(d'_1+d'_2+d'_3)$.

In order to calculate the interpolated Strand Data "s'" at coordinate (x', y') [402], the calculated weight values $w_1$, $w_2$, $w_3$ and Strand Data $s_1$, $s_2$, $s_3$ at each respective root $(x_1, y_1)$, $(x_2, y_2)$, and $(x_3, y_3)$ is used, such that the interpolated Strand Data s' at coordinate (x', y') [402] can be calculated using the formula: $s'=s_1*w_1+s_2*w_2+s_3*w_3$ (where "*" represents the multiplication symbol). This same principle can be extended to other values of N. The calculation of weights $w_n$ in the above example can be performed using other known techniques, and only this technique with reference to FIG. 4 has been explained in order to provide brevity to the detailed description. Accordingly, other known methods of calculating weight values of strand data can be used to calculate Strand Data of interpolated roots, while remaining within the scope of the present inventive concept.

Figure 3B:
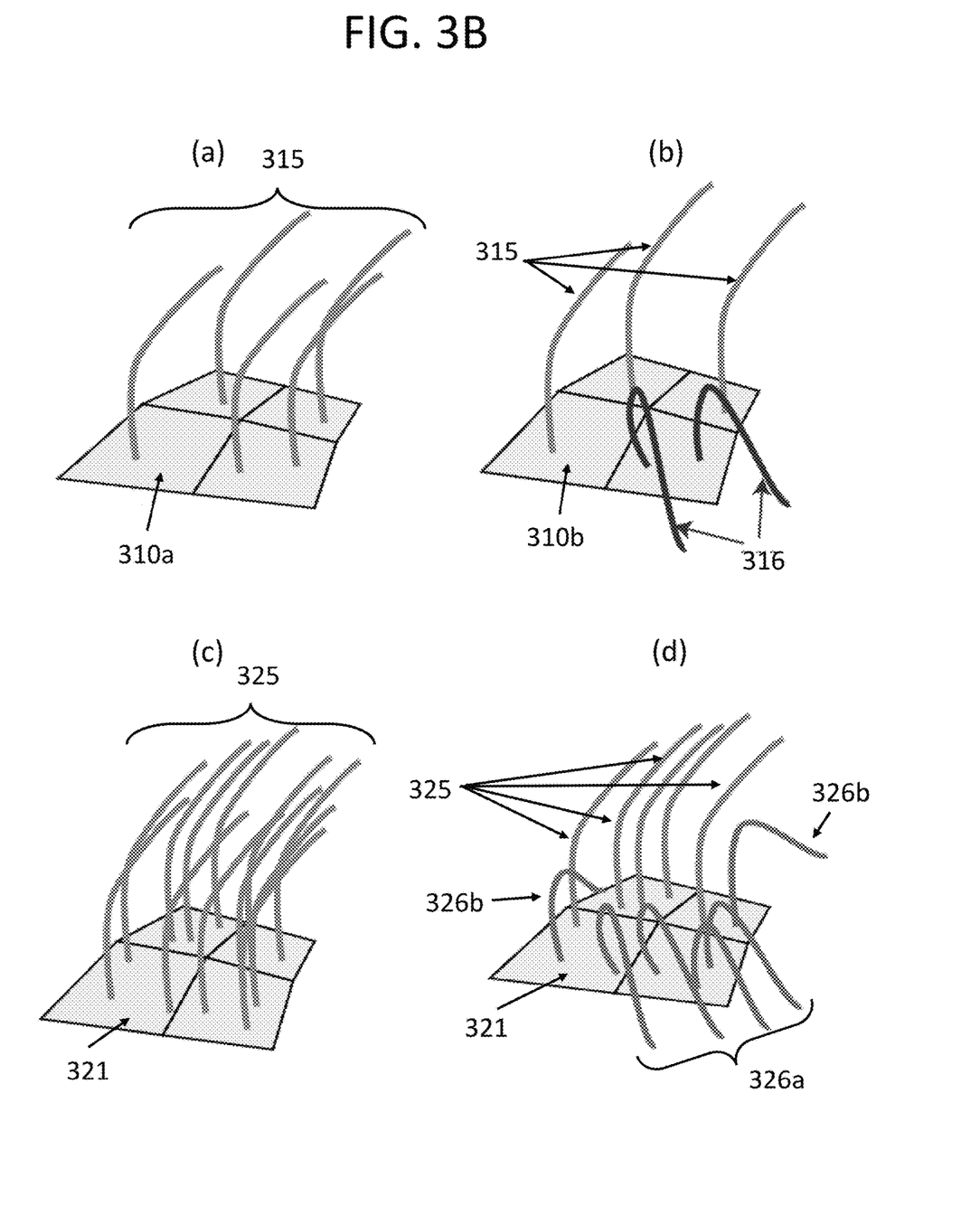
FIG. 3B illustrates processes of initializing a Strand Data Map from actually arbitrary hair strands that have been modified and calculating Strand Data for actual hair strands of an arbitrary hair mesh from a Strand Data Map, according to an exemplary embodiment of the present inventive concept.

FIG. 3B illustrates the process steps as described with reference to FIG. 2 and FIG. 3A above, wherein a Strand Data Map is created from a hair mesh disposed on a base surface 310a, similar to base surface 201a of FIG. 2. However, FIG. 3B illustrates these process steps from a viewpoint of actual hair strands in the mesh, and not simply the roots. In other words, FIG. 3B provides a 3D viewpoint of the process steps described with reference to FIG. 2 and FIG. 3A.

Referring to diagram (a) of FIG. 3B, hair strands [315] are generated on a Base Surface 310a. Diagram (b) of FIG. 3B illustrates where the shape of two of the hair strands [315] are selected(i.e., modified), thus being represented now as reference number [316] to differentiate the modified hair strands [316] from the un-modified hair strands [315]. The modified hair strands [316] according to this example are two of the hair strands [315] after being combed down. However, any desired modification can be performed on any number of the hair strands [315] without deviating from the exemplary embodiments of the present inventive concept. The process as described with reference to FIG. 2 is applied here first to initiate a Strand Data Map 310b with the selected strands [316] being provided with Strand Data indicative of the modifications as well as other properties of the strands, similar to the initialized Strand Data Map 201b. Once the Strand Data Map 310b is initialized, the modified hair strands [316] should be considered as being represented by "stars" (not illustrated) in order to remain consistent with the legend provided in paragraph [0051] above. In other words, once the modified hair strands are given Strand Data and saved in a Strand Data Map, these modified hair strands will be identified with a "star" symbol.

Diagram (c) of FIG. 3B illustrates a new hair mesh of arbitrary hair strands [325] generated on a Base Surface 321. Diagram (d) of FIG. 3B illustrates where the process steps described with reference to FIG. 3A are applied to the new Base Surface 321 having the dense set of arbitrary hair strands [325]. More specifically, diagram (d) illustrates where the Strand Data Map 310b of diagram (b) is applied to the newly generated Base Surface 321 and arbitrary hair strands 325 to calculate and assign Strand Data to the strands 325 by interpolating N Strand Data values from the hair strands [316] in the Strand Data Map 310b.

As illustrated in diagram (d), six of the hair strands [315] are determined to have roots closest to the hair strands [316] of the Strand Data Map 310b, and therefore interpolation can be performed for these hair strands to obtain Strand Data represented as four hair strands [326a] and two hair strands [326b]. The four middle hair strands [326a] are shown to be very similar in shape to the hair strands [316] in the Strand Data Map 310b, while the left-most hair strand [326b] and the right-most hair strand [326b] are illustrated to be less altered. This is due to the fact that these hair strands [326b] are farther from the hair strands 316 (in Data Map 310b) than are the middle four hair strands [326a], and therefore Strand Data for the hair strands [326b] are determined using the calculated weights of the hair strands [316] as described above with reference to FIG. 4. Since hair strands [326b] are farther from hair strands [316] than are the hair strands [326a], the calculated weights are also going to be different, resulting in different Strand Data to be provided to the hair strands [326b].

The hair strands that remain labeled as reference number [325] in diagram (d) of FIG. 3B are hair strands closest to the un-modified hair strands 315 in Strand Data Map 310b, and therefore Strand Data for these hair strands [325] will not be calculated.

Referring back to FIG. 3A, after arbitrary hair Strand Data for hair strands on the Base Surface 301a has been calculated using the root coordinates in the Strand Data Map 201b as describe above, new Strand Data can be calculated for additional generated arbitrary hairs containing a selection (hairs that are modified in some way). In other words, a Strand Data Map initiated from the process illustrated in diagram 301b of FIG. 3A can be applied to a newly generated mesh of hair strands where some of the hair strands are selected. Then calculated Strand Data for the hair strands in the newly generated mesh can be stored as another Strand Data Map.

Figure 5:
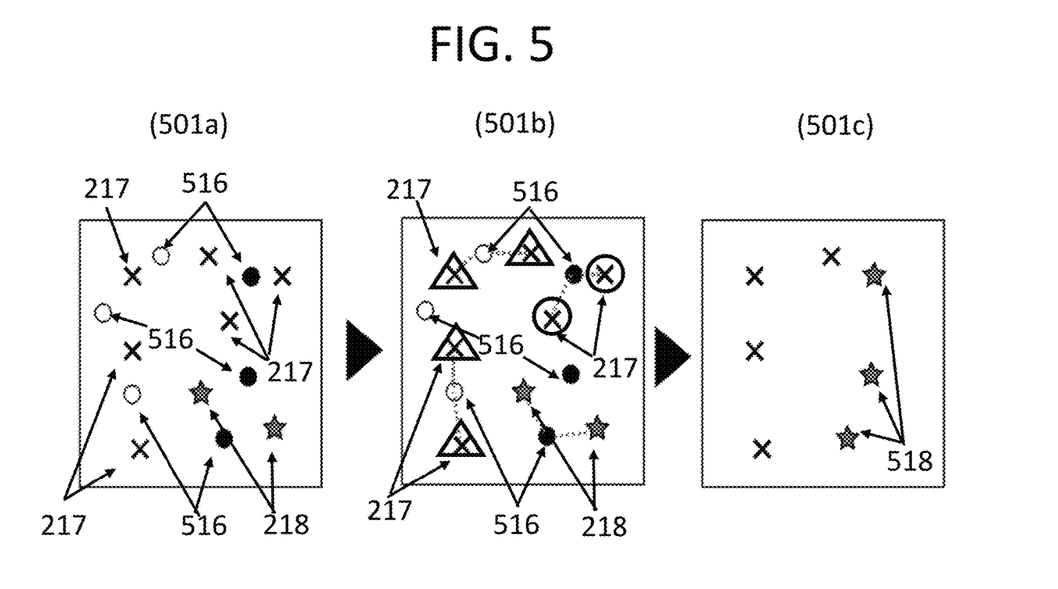
FIG. 5 illustrates a process of setting new Strand Data from an arbitrary hair mesh containing modified and un-modified hair strands, according to an exemplary embodiment of the present inventive concept.

FIG. 5 illustrates a process of setting new Strand Data from arbitrary hairs containing a selection. Referring to FIG. 5, arbitrary hair strand root coordinates [516] of a hair mesh can be generated (both hollow circles ○ and solid circles ● illustrate the newly generated roots of arbitrary hair strands) on a Base Surface, as illustrated in diagram 501a of FIG. 5. Note that the hair mesh in diagram 501a is illustrated as being super-imposed by the previously established Strand Data Map 201b illustrated in FIG. 2, where the un-modified roots [217] remain labeled with an "x" and the roots with Strand Data [218] remain labeled with a star. From among the arbitrary hair roots [516], the hair roots that are "selected" will now contain modified Strand Data, as indicated by the solid circles ●, while the rest of the arbitrary hair roots remain untouched (not selected), as illustrated by the hollow circles ○, and therefore contain their previous Strand Data. The Strand Data of the selected root coordinates ● [516] is data that defines the modification(s) of the hair strands.

The process steps according to this exemplary embodiment are designed to capture the modifications (selected roots ●) into a new Strand Data Map using a previously stored Strand Data Map (i.e., Strand Data Map 201b of FIG. 2 in this case). For each root coordinate within the Strand Data Map 201b the user then finds the closest N roots to the new hair strands (or hair mesh). Note that in diagram 501b four of the six un-modified root coordinates "x" [217] (roots enclosed with a triangle for clarity), which are closest to the "untouched roots" o [516], will not be modified, and therefore remain designated as un-modified "x". The Strand Data Map 201b, overlaid on the Base Surface containing root coordinates [516], as illustrated in diagrams 501a and 501b of FIG. 5, shows the stars [218] in the Strand Data Map 201b as the root coordinates having Strand Data. These hair root coordinates [218] in particular are used to find the closest roots in the new hair mesh.

As illustrated in diagram 501c of FIG. 5, the selected roots ● (roots including the Strand Data) of the new hair mesh illustrated in diagram 501a of FIG. 5 can then be inserted into the Strand Data Map 201b, and are now represented by new reference number [518] to indicate that new Strand Data has been inserted into the root coordinates of roots [516] that have been selected. As pointed out above, the new Strand Data defines the modifications to the selected roots ● [516]. According to the present exemplary embodiment, at this point all hair roots [217] and [218] in the Strand Data Map 201b whose closest roots are the ones closest to the selected roots ● in the new hair mesh can be deleted, as illustrated in the resulting diagram 501c of FIG. 5. In other words, the two root coordinates in Strand Data Map 201b represented by stars [218] (roots with modified Strand Data), and the two circled x root coordinates [217] (the "unmodified" roots) in Strand Data Map 201b closest to the selected roots ●, have been deleted.

Alternatively, according to another exemplary embodiment, the roots in the Strand Data Map 201b (overlaid in diagrams 501a and 501b) whose closest roots are the ones closest to the selected roots ● [516] in the new hairs, can be updated by adding information from the closest hair roots thereto (not illustrated).

As a result, all the roots in a hair mesh which are not selected ○ [516] are ignored, and all the roots which are selected/modified ● [516] in the hair mesh will replace any roots within the Strand Data Map 201b from FIG. 2, to which they are closest. The roots which are selected and inserted into the Strand Data Map 201b are stored with their Respective Strand Data, as indicated by reference number [518]. At this point the Strand Data Map 201b is updated as a new Strand Data Map illustrated in diagram 501c.

Figure 6:
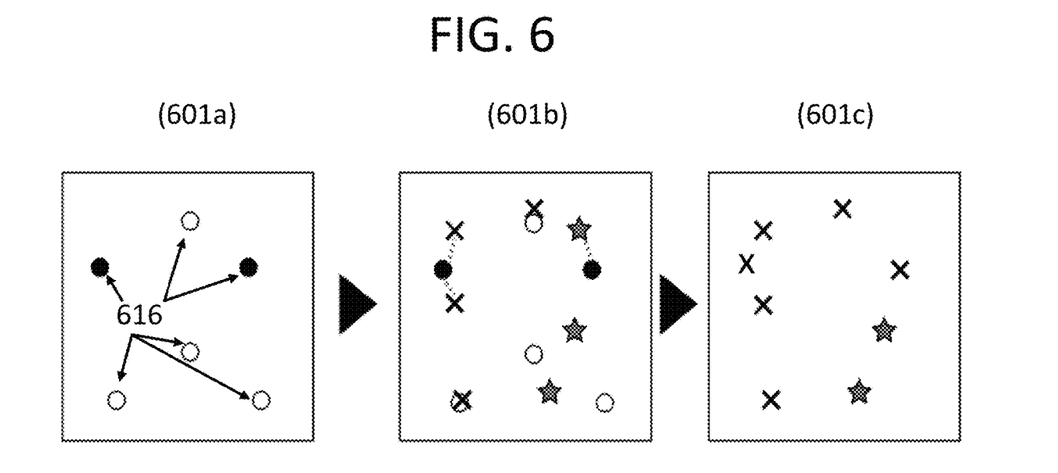
FIG. 6 illustrates a process of resetting values from an arbitrary hair mesh containing modified and un-modified hair strands.

FIG. 6 illustrates a process of resetting values from an arbitrary hair mesh containing a selection, according to another exemplary embodiment. In order to help understand the process steps described in this process, similar to the arbitrary roots generated with reference to FIGS. 2 and 5, the hollow circles ○ will represent arbitrary roots [616] that have not been selected (i.e., not modified) and the solid circles ● will represent arbitrary roots [616] that have been selected (i.e., modified/edited in some way). Referring to FIG. 6, a hair mesh 601a with arbitrary root coordinates [616], including two root coordinates ● that are selected, is generated. For each root coordinate in the newly initiated Strand Data Map in diagram 501c of FIG. 5, the closest roots in the new hair mesh 601a can be found. As illustrated in diagram 601b of FIG. 6, the hair mesh 601a is super-imposed with the Strand Data Map 501c. Next, all of the roots in the Strand Data Map 501c that are closest to the selected roots ● in the new hair mesh 601a are deleted and the selected roots ● from the new hair mesh 601a can be inserted into the Strand Data Map, at which point their coordinates are marked as "empty," as illustrated in diagram 601c by X's. This process is useful for allowing a user to manually reset (remove) any modifications made to a hair mesh through a Strand Data Map for the purpose of selectively restoring parts of a hair mesh to its original state.

According to the processes described above, the shape of computer generated hair can be modeled and edited, and properties of generate hairs can be calculated to generate a new Strand Data Map. This provides the ability to allow for changing the number, order, or positions of the strands arbitrarily during the modeling process, or thereafter.

As a result of the above described processes, several highly beneficial advantages are provided. For example, real-time display of dense hairs can be sped up since only a subset percentage of the hairs is required to be displayed to the user. More specifically, the user can manipulate strands within a subset of hairs and the edits made will then apply to hidden hairs optimally when they are finally rendered.

Another advantage of the processes according to the above-described example embodiments is that a user can dynamically increase or decrease the amount of previewed hairs and continue editing the hairs at different levels of sparsity. In this way, high frequency of detail can be achieved in specific places where needed, while more general/sparse detail can be modeled in other places. Therefore, only those areas which are edited will incur modifications in the Strand Data Map. As a result, high frequency modifications will survive edits in sparse hair as long as a user does not directly modify the hair in the same areas.

Yet another advantage of the processes described above is that a user can "isolate" parts of dense hair by displaying only a full or a subset of hairs within a narrow region of the overall hair style. For example, the user can edit only the banks of a hair style. Since only changes to edited hairs are stored within the Strand Data Map, the changes to other parts of the hair will remain intact. This is exemplified in FIG. 7.

Figure 7:
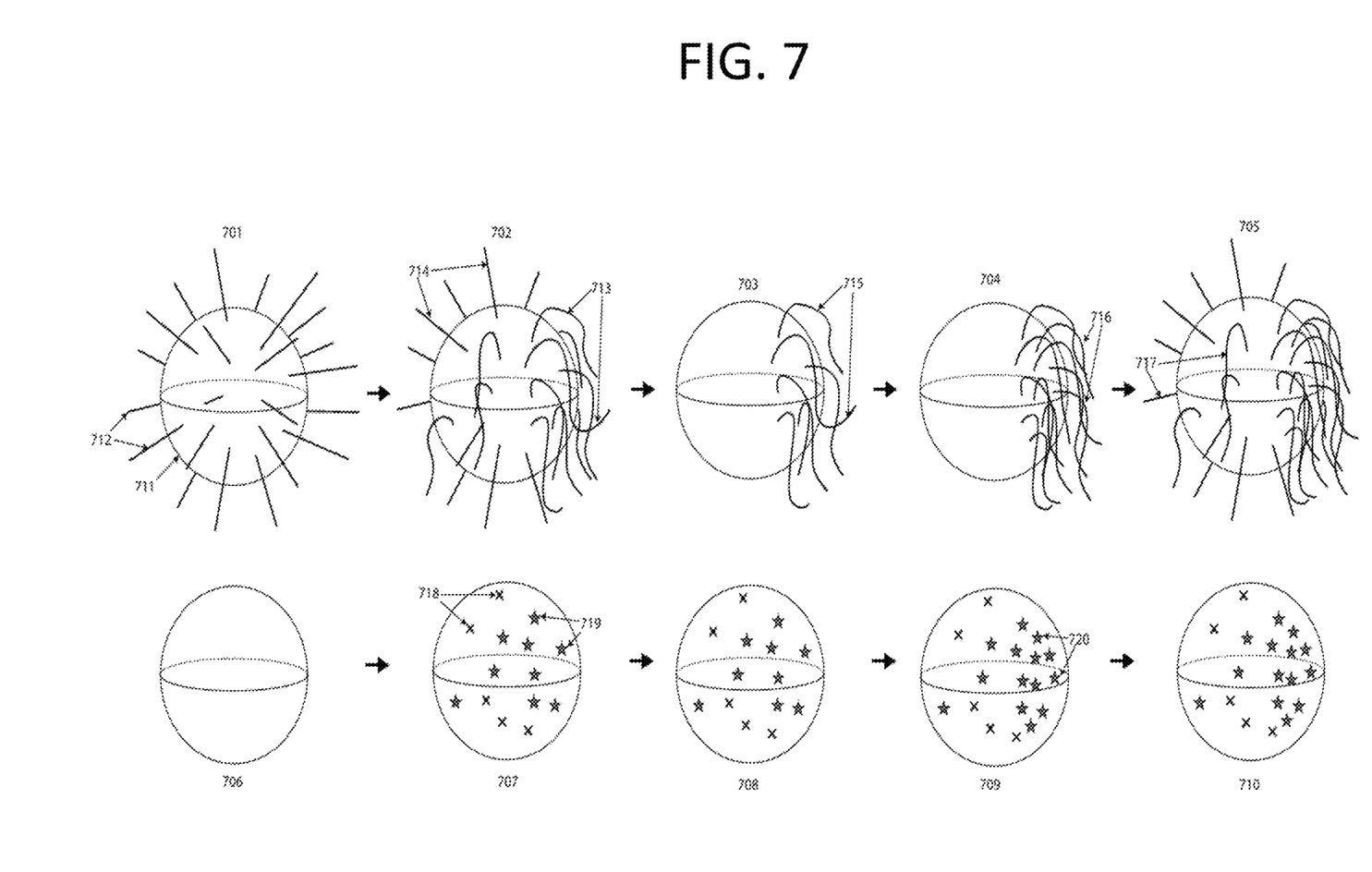
FIG. 7 illustrates process steps of performing hair modeling according to an exemplary embodiment of the present inventive concept.

Referring to FIG. 7, from left to right we have a progression of hair mesh modeling process steps starting with step 701 of generating straight hair strands 712 attached to a surface 711, such as, for example a sphere, as an initial hair mesh. At this point a Strand Data Map 706 has not been initialized, and thus is empty. A user can then modify the shapes of some strands 713 while leaving others 714 unmodified, thus producing the first step 702 of hair editing action.

A Strand Data Map 707 can be initialized by inserting empty Strand Data 718 for those hair strands 714 which have not been modified and inserting Strand Data containing at least shape change data 719 for those hair strands 713 which have been modified. The user can then isolate a sub-set of hairs 715 by hiding the rest of the hairs to produce a hair mesh which has a different strand count, as illustrated in step 703. Strand Data Map 707 remains unchanged from previous step 707, as illustrated in step 708. A user can then proceed to add strands to the isolated hair mesh shown in step 703 and modify the strand shapes 716, as illustrated in step 704. For the newly added strands and strand shape edits, new Strand Data 720 is inserted into Strand Data Map 708, now illustrated as an updated Strand Data Map 709. A user can then unhide hair strands previously hidden in step 703 to produce a hair mesh as illustrated in step 705, where strand count and order are once again changed due to the unhidden strands 717. Strand Data Map 710, which is the same as Strand Data Map 709, can then be applied to the hair mesh 705 to reproduce all of the hair editing which was performed in step 704 without loss of any data, and while still preserving the shapes of previously hidden hair strands.

Still another advantage of the processes described above is that after modeling a hair style using a Strand Data Map, a user can completely modify/edit the input hairs, their root positions, their order, or count in any way, and the modifications/edits will continue to be applied to the arbitrary new input hair with the same level of quality.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

Definitions of technical terms used throughout the specification:

Base Surface: A geometric 3D representation of some surface on which hair is generated. For example, it could be a polygon mesh or a NURBS surface.

Root: First end (starting) point of a hair strand, typically attached to a surface.

Strand Data: Various information attached to a strand which defines its properties. This information may include strand's shape (as defined by its constituent vertex positions), thickness, texture coordinates, grouping information, shading information, whether a strand was deleted, and/or custom user data. This information may be defined as a single entry per-strand, as multiple entries one per each of the strand's vertices (or otherwise along its length), or using a parametric position coordinate along the strand (from 0 at its root to 1 at its tip).

Root Coordinate: A unique position of a hair strand's root on a base surface. The coordinate may be specified as relative to the base surface, for example using 2D texture coordinates or a triangle index and barycentric coordinates on said triangle, or it can be specified as a 3D coordinate within world space. The only logical requirement we impose on root coordinates is an ability find if one root coordinate is closer to another root coordinate than a third root coordinate.

Strand Data Map: A structure which stores many unique Root Coordinates and Strand Data associated with each said stored Root Coordinate. It allows quick lookup of Strand Data given a Root Coordinate, including finding one or more Strand Data closest to a given Root Coordinate. Some Root Coordinates within a Strand Data Map may not store any Strand Data, in which case they're considered "Empty".

Closest Root Coordinates: When we refer to "closest" root coordinates, this can mean closest by spatial distance or by using some other algorithm to determine which Root Coordinate is "closest" to another Root Coordinate.

What is claimed is:

1. A method of modeling hair strands, comprising:
generating, with a computer processor, a first base surface containing a plurality of hair strands with root coordinates;
modifying at least one property of one or more hair strands in the base surface;
storing the at least one modified property of the one or more hair strands with data representing the modifications to initialize a first strand data map;
generating a second base surface containing a plurality of hair strands with root coordinates;
calculating strand data for each of the hair strands on the second base surface whose closest root coordinates in the first initialized strand data map have strand data by using the strand data of the root coordinates closest thereto;
assigning the calculated strand data to the root coordinates of the hair strands whose closest root coordinates in the strand data map have strand data and leaving the remaining hair strands on the second base surface un-modified;
generating a third base surface containing a plurality of hair strands with root coordinates, wherein strand data of one or more of the root coordinates is modified;
applying the first strand data map to the third base surface; and
inserting the modified root coordinates with modification strand data into the first strand data map to initialize a second strand data map.

2. The method of claim 1, further comprising;
deleting all root coordinates in the second strand data map whose closest root coordinates are the root coordinates modified in the third base surface.

3. The method of claim 1, further comprising:
updating the root coordinates in the second strand data map whose closest root coordinates are the root coordinates modified in the third base surface by adding the modification information of closest root coordinates thereto.

4. The method of claim 1, wherein the operation of calculating strand data for each of the hair strands on the second base surface which are closest to the root coordinates in the first updated strand data map is performed by interpolating the hair strand data based on strand data stored in the strand data map.

5. The method of claim 1, wherein the at least one property being modified includes one or more of shape data, width data, and texture data.

6. The method of claim 1, further comprising:
generating a fourth base surface containing a plurality of hair strands with root coordinates, strand data of one or more of the root coordinates being modified;
applying one of the first or second strand data map to the fourth base surface;
deleting all of the roots in the applied strand data map which are closest to the modified roots coordinates in the fourth base surface; and
inserting the modified strand data of the fourth base surface into the applied strand data map with strand data being set to be unmodified data.

7. A system for modeling hair strands, comprising:
a computing device having a processor, wherein the processor is configured to:
generate a first base surface containing a plurality of hair strands with root coordinates;
modify at least one property of one or more hair strands;
store the at least one modified property of the one or more hair strands with data representing the modifications and the non-modified hair strands with un-modified data to initialize a first strand data map;

generate a second base surface containing a plurality of hair strands with root coordinates;
apply the first strand data map to the second base surface;
calculate strand data for each of the hair strands on the second base surface whose closest root coordinates in the first strand data map have strand data by using the strand data of the root coordinates closest thereto;
assign the calculated strand data to the root coordinates of the hair strands whose closest root coordinates in the strand data map have strand data while leaving the remaining hair strands on the second base surface un-modified;
store the assigned strand data as a second strand data map;
generate a third base surface containing a plurality of hair strands with root coordinates, wherein strand data of one or more of the root coordinates are modified;
apply the second strand data map to the third base surface; and
insert the modified root coordinates with modification strand data into the second strand data map.

8. The system of claim 7, wherein the processor is further configured to:
delete all root coordinates in the second strand data map whose closest root coordinates are the root coordinates modified in the third base surface.

9. The system of claim 7, wherein the processor is further configured to:
update the root coordinates in the second strand data map whose closest root coordinates are the root coordinates modified in the third base surface by adding the modification information of closest root coordinates thereto.

10. The system of claim 7, wherein the operation of calculating strand data for each of the hair strands on the second base surface which are closest to the root coordinates in the first strand data map is performed by interpolating the hair strand data based on strand data stored in the strand data map.

11. The system of claim 7, wherein the at least one property being modified in includes one or more of shape data, width data, and texture data.

12. The system of claim 7, wherein the processor is further configured to:
generate a fourth base surface containing a plurality of hair strands with root coordinates, one or more of the root coordinates being modified;
apply one of the first or second strand data map to the fourth base surface;
delete all of the roots in the applied strand data map which are closest to the modified roots coordinates in the fourth base surface; and
insert the selected roots into the applied strand data map with strand data being revised to be un-modified data.

13. A non-transient computer-readable medium comprising instructions executed by a processor of a computing device to:
generate a first base surface containing a plurality of hair strands with root coordinates;
modify at least one property of one or more hair strands;
store the at least one modified property of the one or more hair strands with data representing the modifications and the non-modified hair strands with un-modified data to generate a first strand data map;
generate a second base surface containing a plurality of hair strands with root coordinates;
apply the first strand data map to the second base surface;
calculate strand data for each of the hair strands on the second base surface whose closest root coordinates in the first strand data map have strand data by using the strand data of the root coordinates closest thereto;
assign the calculated strand data to the root coordinates of the hair strands whose closest root coordinates in the strand data map have strand data and leave the remaining hair strands on the second base surface un-modified;
store the assigned strand data as a second strand data map;
generate a third base surface containing a plurality of hair strands with root coordinates, wherein strand data of one or more of the root coordinates is modified;
apply the second strand data map to the third base surface; and
insert the modified root coordinates with modification strand data into the second strand data map.

14. The non-transient computer-readable medium of claim 13, wherein the instructions are further executed by the processor to delete all root coordinates in the second strand data map whose closest root coordinates are the root coordinates modified in the third base surface.

15. The non-transient computer-readable medium of claim 13, wherein the instructions are further executed by the processor to update the root coordinates in the second strand data map whose closest root coordinates are the root coordinates modified in the third base surface by adding the modification information of closest root coordinates thereto.

16. The non-transient computer-readable medium of claim 13, wherein the operation of calculating strand data for each of the hair strands on the second base surface which are closest to the root coordinates in the first updated strand data map is performed by interpolating the hair strand data based on strand data stored in the strand data map.

17. The non-transient computer-readable medium of claim 13, wherein the instructions are further executed by the processor to:
generate a fourth base surface containing a plurality of hair strands with root coordinates, one or more of the root coordinates being modified;
apply one of the first or second strand data map to the fourth base surface;
delete all of the roots in the applied strand data map which are closest to the modified roots coordinates in the fourth base surface; and
insert the selected roots into the applied strand data map with strand data being revised to be empty data.

18. A method of modeling hair strands, comprising:
generating, with a computer processor, an initial hair mesh of hair strands on a base surface;
modifying shapes of one or more of the hair strands on the initial hair mesh;
initializing a strand data map from the modified hair mesh by inserting empty strand data representing un-modified hair strands and inserting strand data containing at least shape modification data representing the modified hair strands;
exposing a sub-set of the hair strands on the modified hair mesh while hiding the remaining hair strands to produce a hair mesh having a different hair strand count from the initial hair mesh;
adding new hair strands to the exposed sub-set of the hair strands and modifying the strand shapes of hair strands;
inserting new strand data into the strand data map for the newly added hair strands and strand data shape modifications;

exposing all of the hair strands in the modified hair mesh; and applying all of the strand data of the hair strand map to the hair mesh to reproduce all of the hair editing strand data.

19. The method of claim 18, further comprising:

generating a fourth base surface containing a plurality of hair strands with root coordinates, one or more of the root coordinates being modified;

applying the strand data map to the fourth base surface;

deleting all of the roots in the applied strand data map which are closest to the modified roots coordinates in the fourth base surface; and inserting the selected roots into the applied strand data map with strand data being revised to be empty data.

* * * * *